Sept. 18, 1956 J. R. PALMER 2,763,736
CURRENT COLLECTOR
Filed Jan. 8, 1951

INVENTOR.
JAY R. PALMER
BY
ATTORNEY

United States Patent Office 2,763,736
Patented Sept. 18, 1956

2,763,736
CURRENT COLLECTOR

Jay R. Palmer, Mansfield, Ohio, assignor to The Ohio Brass Company, Mansfield, Ohio, a corporation of New Jersey Application January 8, 1951, Serial No. 204,876

5 Claims. (Cl. 191—59.1)

This invention relates to means for collecting current from a trolley wire and has particular reference to a renewable insert of frangible material such as carbon, graphite or a combination of same for use in a holder or shoe of metal.

Experience has demonstrated that a metal holder combined with a non-metallic insert of current conducting material such as carbon offers much less wear upon the trolley wire than an all metal collector regardless of whether it is of iron, copper or a copper base alloy.

Carbon being a frangible material it is subject to breakage before it is worn out through friction, insipient arcing etc., due to impact with metallic fittings associated with the trolley wire such as clamps, ears, frogs, crossings, etc.

These fittings are secured to the trolley wire and constitute a small portion of the length of the trolley system but it is practically impossible to design and construct such fittings without their being somewhat wider where they engage the trolley wire than the diameter of the wire.

The result is that the present day insert is subject to a severe impact when it meets the fittings. This tends to fracture the insert and in some cases the damage is so severe that the insert is rendered useless before its normal ultimate wear has been reached or the insert pieces may actually be thrown from the holder as it moves along the wire.

As the collector insert moves along the overhead system, the trolley wire which constitutes from 90 to 95% of the same, tends to wear away the insert and form therein a groove of the width of the wire. As long as the wear upon the insert is the result of the trolley wire, any damage to the insert is likely to be from impact with the overhead fittings.

However when the trolley wire has worn a groove to a depth where the overhead fittings which are wider at the trolley wire than the trolley wire engage the insert, the tendency is for the fitting to crowd or wedge into the groove thus the insert receives a severe splitting blow when it encounters the fittings.

If the insert is of the present day construction the side faces are securely supported by the side walls of the holder and the result is far from an ideal operating condition when the insert encounters the overhead fittings because the upper edges of the insert along the groove will ride the fittings, if the groove has worn to a sufficient depth, in place of the fittings riding within the groove as does the trolley wire.

The result is a badly cracked and broken insert and poor operating conditions and the replacement of the insert before it has served its intended mileage.

It has been found that after the trolley wire has worn the original groove to a depth where the insert impinges upon the overhead fittings, if then the side walls of the insert forming the groove are removed as by breaking-away, that there will be no further immediate interference with the overhead fittings and the trolley wire will proceed to form another groove in the remaining portion of the insert and by the time the second groove has worn to a depth where the insert again impinges upon the fittings, the insert will have completed its normal life cycle and be ready for replacement.

As long as the side faces of the insert are securely braced by the walls of the holder as is now the practice, this "breaking-away" of the walls of the initial groove does not occur, or if they do crack through they may still be held in place by the side walls of the holder.

One object of this invention is to provide an insert as a substitute for that now in commercial use and of such construction that wear will be increased to that of its intended limit without increasing the dimensions over those of the present commercial insert and in particular the vertical height.

Another object of this invention is to provide an insert of frangible current conducting material so constructed as to have two distinct portions integrally united, namely an upper unsupported portion which will break away along predetermined lines after a groove has worn therein to approximately a predetermined depth, and a lower portion left intact after the upper portion has broken-away and a part of which is subject to wear by the trolley wire to a predetermined depth.

Another object is to provide a holder for the insert such that the upper portion of the insert is free to break-away along predetermined lines when it impinges against overhead obstructions, while the lower portion is securely held until its cycle of intended wear has been completed.

Other objects and advantages are set forth in the description to follow and the drawing accompanying the same.

To carry out the purpose of this invention a full description follows aided by the accompanying drawing—

Fig. 4 is an end view partly in section of Fig. 3 after the trolley wire has worn the groove therein to a predetermined depth and the upper side walls are being crowded by the trolley wire fitting and broken through.

The insert herein contemplated comprises an elongated body 1 of a frangible non-metallic current conducting material such as carbon of some form.

Figure 1:
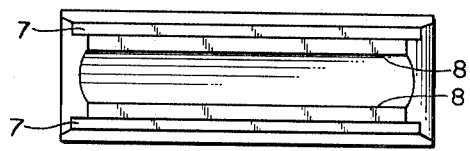
Fig. 1 is a top view of this invention.
Figure 2:
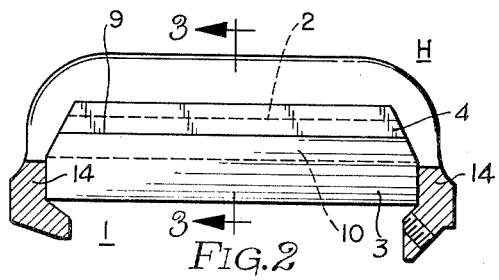
Fig. 2 is a side view of Fig. 1 with a holder shown in partial section.
Figure 3:
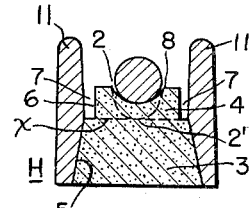
Fig. 3 is a transverse sectional view taken on line 3—3 of Figure 2.
Figure 8:
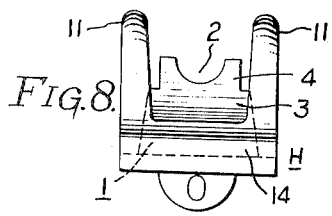
Figure 8 is an end view of the holder and insert assembly of this invention illustrated in Figure 2.

The body as shown in Figs. 1, 2 and 3 has a longitudinal groove 2 in its upper face which is of ample width initially to receive the trolley wire. The body has two longitudinal portions; a lower portion 3 and an upper portion 4.

Figure 6:
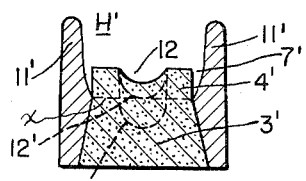
Fig. 6 is a section similar to Fig. 3 showing a modified insert and holder.

The lower portion 3 may be said to have the cross-section of an isosceles trapezoid that is, having only two parallel sides, upper and lower, or the body of a truncated wedge, and the upper portion 4 to have the cross-section of a rectangle which is true also of Fig. 6. The side faces 5 are obliquely and uniformly disposed and the faces 6 are parallel. The division between the two portions is indicated by a dotted line $x$.

The insert is intended for use in a metal holder H, one form of which may be similar in many respects to that shown in application Serial Number 177,370, filed August 3, 1950, now Patent Number 2,700,707 with modifications so as to receive the insert 1, as indicated in Fig. 3.

The width of the portion 4 is less than that of the upper base or crown of portion 3, whereby there is a space 7 between the side faces 6 of the portion 4 and the inner faces of the flanges 11 of holder.

Figure 4:
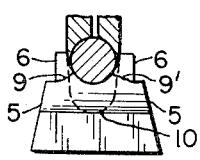
Figure 5:
Fig. 5 is a sectional view of a trolley wire combined with a trolley clamp or fitting.

Referring to Fig. 3, as the groove 2 deepens forming a groove of the width of the diameter of the trolley wire through contact of the insert with the trolley wire as it moves along the wire under an upward pressure, the groove 2 eventually reaches a depth (2' Fig. 3) where the insert is no longer free of impingement upon the overhead fittings due to their width being greater than the diameter of the trolley wire (Fig. 5), with the result that the edges 8 of the groove ride upon the overhead fitting or the fitting tends to wedge into the groove, (Fig. 4) thereby exerting a lateral strain upon the side walls of the groove and causing them to break and fall away along a longitudinal plane indicated at 9 and 9' (Figs. 2 and 4).

The insert is now free of portion 4, and the trolley wire will now wear into the upper face of portion 3, which is unbroken and unmarked and will form a new groove 10 in portion 3 as a continuation of groove 2—2' of the width of the trolley wire. However, by the time that the groove has worn to a depth where there is sufficient interference with the overhead fittings, the insert will have served its intended car miles and be ready for replacement.

While the side walls of portion 3 may be vertically parallel that is forming a rectangular cross-section, it is to be noted that with the sloping walls 5, should there be cracking of the section 3, the parts will be supported and retained in position in the holder until time to replace the worn out insert. In fact the shape of the side walls of the portion 3 and of the holder are such as to cooperate to retain a new insert within that holder.

In Fig. 6 is shown a section corresponding in position to that of Fig. 3, but of a modified form of insert and holder. Here the side walls 11' of the holder are so formed above the upper base of portion 3' of the insert that a space 7' is provided along the sides of the portion 4', thus removing any side support to the portion 4' as in the case of portion 4 of Fig. 3. The walls of the portion 4' of Fig. 6 will weaken as the groove 12 wears deeper and will later impinge upon the overhead fitting, as in case of the insert Figs. 3 and 4.

This impact will cause the side walls of the groove 12' of the portion 4' to "break-away" leaving the portion 3' intact to be acted upon by the trolley wire to form the new groove 13 and complete the intended life of the insert.

Figure 7:
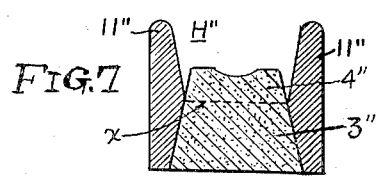
Fig. 7 is a section similar to Fig. 3 showing a modified insert and holder.

If desired the cross-section of the combined upper and lower portions of the insert may be that of an isosceles trapezoid or an elongated body forming the frustum of a rectangular based pyramid and the holder provided with flanges as shown in Figs. 3 or 6. In either case the characteristics of the insert would be essentially the same and groove 13 of Figure 6 would be worn in the lower portion of the insert body. As shown in Fig. 7, the side faces of the insert are upwardly extending converging planes which include the side faces of portions 3" and 4". The holder H" and portion 4" are laterally spaced as in the previous forms. In either case the upper portion of the insert will be unsupported as in Figs. 3 and 6.

In describing the several forms of inserts as having two portions, it is to be understood that the portions are not separately formed but are formed as an integral unit.

As the groove in the upper portion of the insert Figs. 3, 6 and 7 wears deeper, the groove finally reaches a depth where the single upper portion becomes two side-by-side portions with separately formed and much weakened connections with the lower portion and subject to breakage from impact with overhead trolley fittings.

The upstanding walls of the holder in Figs. 3, 6 and 7 are so related to the insert that they securely retain the insert when new and will grip and retain the lower portion of the insert after the upper portion breaks-away which it is free to do as it is spaced laterally from the upstanding walls of the holder and unsupported thereby.

The holder of Figs. 3, 6 and 7 are similar in that the lower inner faces of the flanges or walls are alike and their respective planes converge upwardly forming means to engage and retain the insert within the receptacle formed in the holder; the planes of the upper inner faces of the flanges are obliquely disposed to the planes of the said lower inner faces of all three forms but in case of the Figs. 6 and 7 the planes of the upper inner faces converge downwardly while those of Fig. 3 are parallel. The lines of intersection of the said planes coincide with the planes of demarcation between the upper and lower portions of the insert.

Having described the invention what I claim is:

1. A current collector adapted to be carried by supporting means to collect current from a trolley wire as the collector moves along the wire comprising, a metal holder having upstanding spaced side walls and end walls, the said walls forming a receptacle with open top and open bottom, an insert of frangible material positioned within the receptacle by the current collector supporting means; and subject to wear, the upper surface of the insert adapted to contact the trolley wire as the collector moves along the wire whereby a longitudinal groove is formed in the insert of a width substantially equal to the diameter of the trolley wire and becoming deeper as the insert wears away, said end walls enclosing the lower part only of the ends of the insert, the insert having a top wear portion of uniform width throughout its height which is less than the width between the walls of the recess opposite said top portion and having a lower wear portion contiguous with the top wear portion and of the same width as the spacing of the adjacent side walls of the holder, the said adjacent side walls bearing against the side walls of the lower wear portion of the insert.

2. A current collector adapted to be carried by supporting means to collect current from a trolley wire as the collector moves along the wire comprising, a unitary elongated insert member of non-metallic current conducting material, the insert provided with an upper wear portion and a lower portion integrally united with the upper portion, the lower portion having an isosceles trapezoidal cross-section the upper part of which constitutes a wear portion, the cross-section of the upper wear portion being that of a rectangle in which the opposite longitudinal faces are upstanding and parallel, a longitudinal groove in the upper face of the upper portion to receive the trolley wire, a metal holder forming a receptacle for the insert positioned by the current collector supporting means, the holder having a top opening to receive the trolley wire and a bottom opening through which to pass the insert into and out of the holder, the holder having side walls corresponding to and bearing against the faces of the lower portion of the insert and preventing the upward displacement of the insert, the side walls of the holder extending above the lower portion of the insert and spaced laterally from the side faces of the upper portion of the insert, and metal bridging means extending between and connecting to the lower portion of the side walls at their ends to maintain the side walls in spaced relation and extending upwardly from the lower face of the insert member a distance less than the lower portion of the insert member.

3. A insert for a current collector comprising, an elongated body of frangible current conducting material operable to gather current from a trolley wire as the collector moves along the wire, the body provided with a lower wear portion adapted to be received and held by a metal holder, the side faces of the said lower wear portion converging upward forming thereby a trapezoidal cross-section, the upper part of the said lower wear portion being subject to wear, the body also provided with an upper wear portion positioned on the upper base of the lower wear portion contiguous with the said lower portion and forming an integral part therewith, the upper wear portion having a transverse width narrower than the transverse width of the lower part of the lower wear portion and having parallel side faces and a shallow groove in its upper face for the length thereof and subject to wear deeper during operation whereby the upper wear portion will be formed into two parts as the groove wears deeper and the parts are subject to being broken away when the groove has worn to a sufficient depth that the upper part of the lower wear portion is subject to a groove being worn therein after the said parts of the upper wear portion have broken-away.

4. A current collector adapted to be carried by supporting means to collect current from a trolley wire as the collector moves along the wire, comprising a metal holder having upstanding spaced side walls and end walls, the end walls being of less height than the side walls, the said walls forming an open top receptacle, a renewable insert of frangible current conducting material positioned within the receptacle by the current collector supporting means and subject to wear, the upper surface of the insert adapted to contact the trolley wire as the collector moves along the wire whereby a longitudinal groove is formed in the insert of a width substantially equal to the diameter of the trolley wire and becoming deeper as the insert wears away, the total depth to which the insert may be worn without contacting the holder being indicated by the height of the said end walls which maintain the side walls in fixed relation, the portion of the insert above the end walls having two stages of wear, namely, a top wear portion and a lower wear portion continuous throughout their length, the top portion having a width throughout its height which is less than the width of the lower wear portion and less than the transverse space between the side walls opposite the said wear portion, the lower wear portion being of the same width as the spacing of the adjacent side walls of the holder, the adjacent side walls bearing against the side faces of the lower wear portion, the upper wear portion being adapted to break and fall away as the groove wears deeper by friction with the trolley wire, leaving the lower wear portion supported by the side walls to take up and continue the wear of the insert, without contacting the holder until the wear reaches the depth where the trolley wire will contact the end walls.

5. A current collector adapted to be carried by supporting means to travel along a trolley wire comprising a metal holder having upstanding side walls with opposed inner side faces converging upwardly connected by end walls of height less than said side walls and cooperating with the side walls to define a receptacle open top and bottom and having an upper section and a lower section, a separately formed elongated insert of carbonaceous material positioned in said receptacle by the current collector supporting means and extending from end to end thereof, the insert having an upper wear portion and a lower portion having a wear part contiguous with the upper wear portion, the lower portion of the insert being disposed in the lower section of the receptacle and retained therein by the side faces of the lower section engaging the side faces of the lower part of the insert and forming a dove-tail lock to retain the insert against upward displacement but permitting removal for replacement through the bottom opening in the holder, the plane of each inner side face of the upper section of the receptacle being obliquely disposed to and intersecting the plane of the corresponding inner side face of the lower section of the receptacle along oppositely disposed longitudinal lines, and the said lines of intersection of the planes of the inner faces of the side walls of the holder coinciding with the plane of demarcation between the upper wear portion and the upper wear part of the lower portion of the insert throughout its length, the upper section of the holder being spaced laterally from the upper wear portion of the insert to permit the said upper wear portion to break away when the insert is worn to a predetermined extent in use.

References Cited in the file of this patent
UNITED STATES PATENTS

| | | |
|---|---|---|
| 1,884,456 | Wilkins | Oct. 25, 1932 |
| 1,951,459 | Wilkins | Mar. 20, 1934 |
| 2,185,269 | Ryan | Jan. 2, 1940 |
| 2,262,374 | Schaake | Nov. 11, 1941 |
| 2,508,531 | Moseley | May 23, 1950 |

FOREIGN PATENTS

| | | |
|---|---|---|
| 529,302 | Great Britain | Nov. 19, 1940 |
| 958,389 | France | Sept. 12, 1949 |